United States Patent
Tucker et al.

(10) Patent No.: US 10,671,650 B2
(45) Date of Patent: Jun. 2, 2020

(54) SYSTEM AND METHOD FOR INTEGRATION AND CORRELATION OF GIS DATA

(71) Applicant: PROSTAR GEOCORP, INC., Grand Junction, CO (US)

(72) Inventors: Nelson Page Tucker, Grand Junction, CO (US); Daniel Edward Colby, Wake Forest, NC (US); Peter James Lynch Forster, Delta (CA); William Steven Slusarenko, Surrey (CA)

(73) Assignee: PROSTAR GEOCORP, INC., Grand Junction, CO (US)

( * ) Notice: Subject to any disclaimer, the term of this patent is extended or adjusted under 35 U.S.C. 154(b) by 563 days.

(21) Appl. No.: 15/434,333

(22) Filed: Feb. 16, 2017

(65) Prior Publication Data
US 2017/0161302 A1    Jun. 8, 2017

Related U.S. Application Data

(63) Continuation of application No. 14/211,908, filed on Mar. 14, 2014, now Pat. No. 9,619,573.

(60) Provisional application No. 61/788,419, filed on Mar. 15, 2013.

(51) Int. Cl.
*G06F 16/29* (2019.01)
*G06F 16/23* (2019.01)

(52) U.S. Cl.
CPC ......... *G06F 16/29* (2019.01); *G06F 16/2365* (2019.01)

(58) Field of Classification Search
None
See application file for complete search history.

(56) References Cited

U.S. PATENT DOCUMENTS

| | | | |
|---|---|---|---|
| 5,704,142 A | 1/1998 | Stump | |
| 5,964,298 A | 10/1999 | Greenspun | |
| 6,282,477 B1 | 8/2001 | Gudat et al. | |
| 6,963,282 B1 | 11/2005 | Yeates et al. | |
| 9,465,129 B1 * | 10/2016 | Olsson | G01V 3/38 |
| 2002/0035432 A1 | 3/2002 | Kubica et al. | |
| 2006/0020417 A1 * | 1/2006 | Koch | G01C 17/28 |
| | | | 702/150 |
| 2008/0281839 A1 | 11/2008 | Bevan et al. | |

(Continued)

OTHER PUBLICATIONS

Canadian Office action dated May 9, 2016 for corresponding CA Application No. 2,846,173, 3pp.

*Primary Examiner* — Christopher J Raab
(74) *Attorney, Agent, or Firm* — Lewis Roca Rothgerber Christie LLP

(57) ABSTRACT

System and method for damage avoidance in an excavation area include: receiving an excavation area and an excavation depth; accessing a database of a plurality of utility assets to identify a buried utility asset within the excavation area and the excavation depth; retrieving information from the database for the identified buried utility asset; fusing the buffer zone associated with the buried utility asset and the depth of the buried utility asset to obtain a latitude buffer zone for the buried utility asset; comparing the latitude buffer zone for the buried utility asset and the excavation depth; identifying a party responsible for the buried utility asset; and automatically transmitting an electronic notification to the party responsible for the buried utility asset.

14 Claims, 5 Drawing Sheets

(56) References Cited

U.S. PATENT DOCUMENTS

| | | |
|---|---|---|
| 2009/0024326 A1 | 1/2009 | Young et al. |
| 2011/0241936 A1 | 10/2011 | Sawyer, Jr. et al. |
| 2013/0246396 A1 | 9/2013 | Clare et al. |
| 2013/0325542 A1 | 12/2013 | Tucker et al. |

* cited by examiner

US 10,671,650 B2

SYSTEM AND METHOD FOR INTEGRATION AND CORRELATION OF GIS DATA

CROSS-REFERENCE TO RELATED APPLICATIONS

This Patent Application is a continuation of U.S. patent application Ser. No. 14/211,908, filed Mar. 14, 2014, which claims the benefits of U.S. Provisional Patent Application Ser. No. 61/788,416, filed on Mar. 15, 2013 and entitled "System And Method For Integration And Correlation Of GIS Data," the entire contents of which are hereby expressly incorporated by reference.

FIELD OF THE INVENTION

The present invention relates generally to GIS data; and more particularly to a system and method for integration and correlation of GIS data.

BACKGROUND

There are many utility assets above ground and below ground in a geographic (project) area that need to be protected and avoided during construction activities in the project area. Furthermore, often some of such utility assets are damaged or need to be repaired and/or updated. Included in these assets are utility lines and components and protected areas, such as archeological sites, riparian zones, and habitat of endangered species. These utility lines include, without limitation, electric power lines, telephone lines, water lines, sewer lines, fiber-optic cable lines, natural gas transmission lines, natural gas distribution lines, and utility lines for transporting hazardous liquids.

There are several practices currently in use to help address damage prevention when groundbreaking or other construction equipment is used around utilities and other assets that need protection. One example includes marking the location of an underground utility asset by painting lines on the ground. Commonly, the utility companies and/or locate service companies are called to the site to place marks (place flags or spray paint on the surface of the ground with an identifying color, for example, red for electric lines, yellow for gas lines and so forth) on the surface to demarcate the location of a specific utility line and/or its components. Such marking is temporary by nature and typically lasts only for the one earth moving operation or ground breaking operation such as removing the surface cover such as pavement, cement, dirt, for which the utilities were marked.

Another typical approach is to make a record of the location of the utility lines as the line was placed in the earth by creating a drawing showing the asset location relative to an existing feature or landmark such as a curb or building. However, the accuracy of the location is dictated by the accuracy of the reference point.

However, in many instances the precision or accuracy of the (location) data in different databases varies, for example, according to how the data was collected, the accuracy of the device that collected the data, the accuracy of the underlying software, and the map/GIS engine. For example, one company's database may have location data accurate up to 5 inches, while another company's location data is accurate up to 1 foot, while the underlying software has an accuracy of 2 inches, and the user's viewing device, e.g., a mobile phone or a tablet has an accuracy of 1.50 feet. Furthermore, users and/or some types of utility assets may have different accuracy requirements.

SUMMARY

The present invention takes into account these various accuracies and generates a single correlated optimum accuracy for these various accuracies.

In some embodiments, the present invention is a computer implemented method for damage avoidance in an excavation area. The method includes: receiving input for defining an excavation project including an excavation area and an excavation depth; accessing a database of a plurality of utility assets, each entry for each utility asset including a type of the utility asset, a location of the utility asset, an accuracy of the data about the location of the utility asset, a buffer zone associated with the utility asset, a depth of the utility asset when buried under the ground, and a party responsible for the utility asset; identifying a buried utility asset within the excavation area and the excavation depth taking into account the buffer zone associated with the buried utility asset; retrieving information from the database for the identified buried utility asset; fusing the buffer zone associated with the buried utility asset and the depth of the buried utility asset to obtain a latitude buffer zone for the buried utility asset; comparing the latitude buffer zone for the buried utility asset and the excavation depth; identifying a party responsible for the buried utility asset; and automatically transmitting an electronic notification to the party responsible for the buried utility asset.

In some embodiments, the present invention is a system for damage avoidance in an excavation area. The system includes: a receiver for receiving input for defining an excavation project including an excavation area and an excavation depth; an interface for accessing a database of a plurality of utility assets, each entry for each utility asset including a type of the utility asset, a location of the utility asset, an accuracy of the data about the location of the utility asset, a buffer zone associated with the utility asset, a depth of the utility asset when buried under the ground, and a party responsible for the utility asset; a processor for identifying a buried utility asset within the excavation area and the excavation depth taking into account the buffer zone associated with the buried utility asset, retrieving information from the database for the identified buried utility asset, fusing the buffer zone associated with the buried utility asset and the depth of the buried utility asset to obtain a latitude buffer zone for the buried utility asset, comparing the latitude buffer zone for the buried utility asset and the excavation depth, and identifying a party responsible for the buried utility asset; and a transmitter for automatically transmitting an electronic notification to the party responsible for the buried utility asset.

DETAILED DESCRIPTION

In some embodiments, the method and system of the present invention electronically aggregates as well as conflates or fuses the utility infrastructure data from different sources (for example, ESRI™, GE Smallworld™, Google™, Bing™, AutoDesk™, etc.) into a single source view and quantifies, measures and qualifies the data as well as the data layers with a single correlated optimum accuracy in order to provide accuracy and confidence levels associated with the data, which in turn may indicate what type of business decision can be made and the risk that could be associated to that decision, with respect to accuracy of the data. If the risk and confidence levels are of concern, the appropriate data source or data layer that needs to be verified and rectified can easily be identified based on precision and pedigree levels in order to increase user confidence and lower risk levels. For example, for high risk utility assets such as gas lines, the required accuracy or precision of the data may be higher. Conversely, for lower risk utility assets such as sewage lines, the desired accuracy or precision may not be as high.

In many instances, the invention stores data about the utility assets, for example, in a precision integration (PI) grid that includes (above or below ground) utility location data combined with a GIS Landbase that includes satellite and/or other imagery and mapping information. Here, precision GPS refers to a GPS system that provides position information, such as latitude, longitude and possibly, elevation data, with accuracies within centimeter ranges. The stored utility location information may be recalled anywhere, anytime using a computer network, such as the Internet and an electronic device such as a portable smart phone or similar devices.

In some embodiments, accuracy is defined as the proximity of a measurement result to the true value. This is often stated as the expected margin of error of a given measurement system. Precision is defined as the reproducibility or repeatability of a measurement system, the degree to which repeated measurements under unchanged conditions result in the same value.

Figure 1:
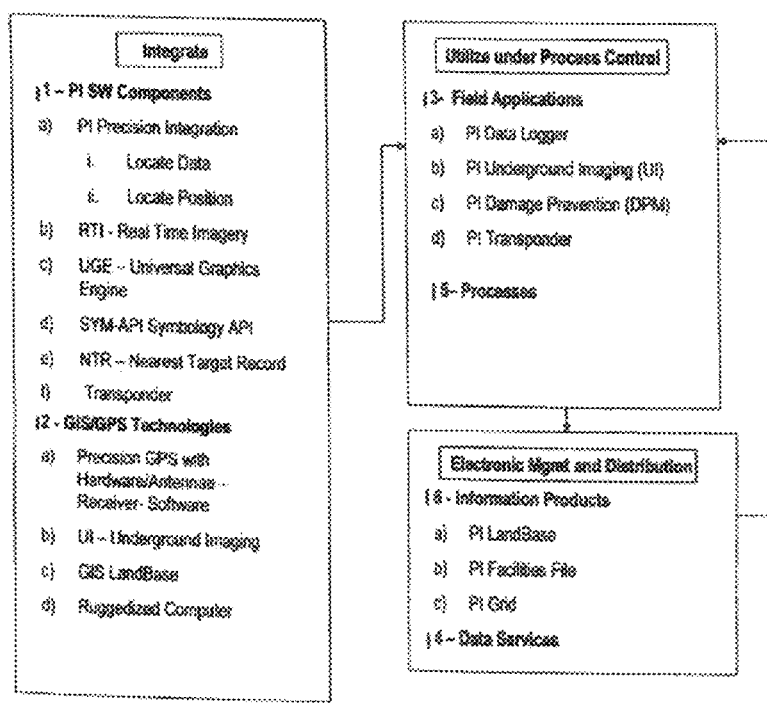
FIG. 1 is an exemplary block diagram of major components of a system constructed, according to some embodiments of the present invention.

FIG. 1 is an exemplary block diagram of major components of a system constructed, according to some embodiments of the present invention. As shown, the major components include PI SW Components 11, GIS/GPS and other location technologies, field software applications 13, data services including electronic data management and distribution system 14, a plurality of different processes 15, and information products 16.

The PI SW Components and the GIS/GPS technologies are integrated to develop or provide the field software applications that are utilized under a process control by the Processes 15. The system of the present invention, utilizing field software applications (executed by a mobile device) under process control, generates or produces the information products 16 that are utilized at different life cycle steps by a user to provide, in various forms, and optionally, on a subscription basis information products. The information products include notification to the utility companies with utilities in the project area of the planned construction, which are managed and distributed by an electronic management and distribution system.

Figure 2:
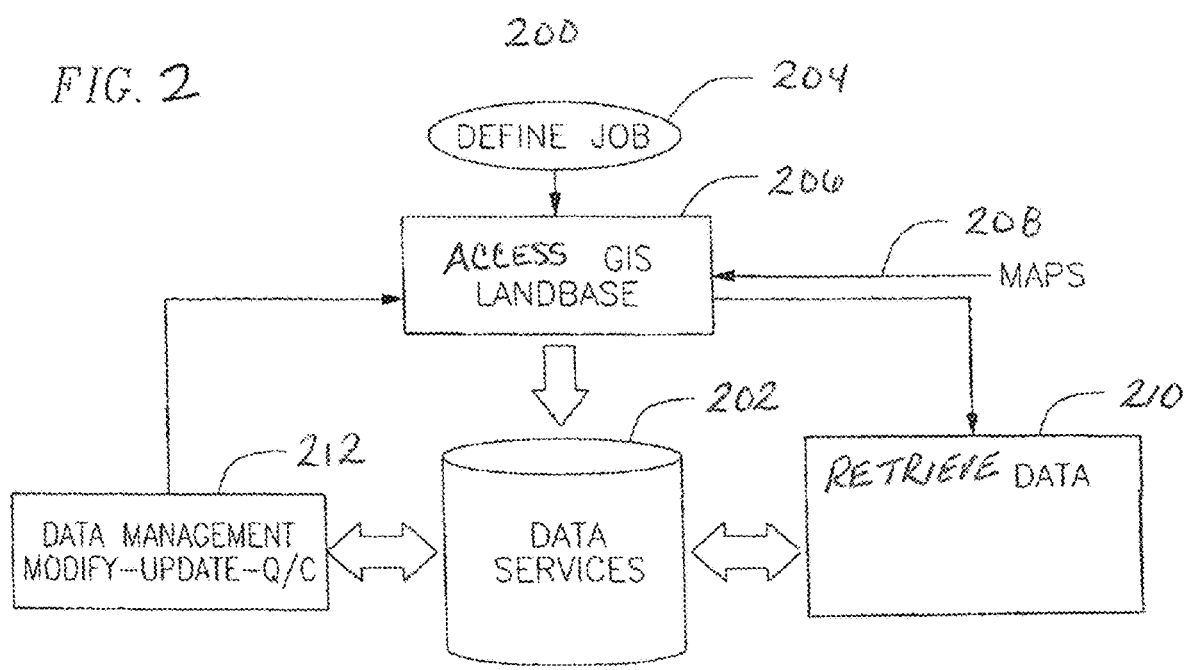
FIG. 2 is an exemplary overview of a data management system 200, according to some embodiments of the present invention.

FIG. 2 is an exemplary overview of a data management system 200, according to some embodiments of the present invention. The illustrated operations may be performed by one or more computers in conjunction with various data services and one or more precision databases 202, as explained herein. Initially, a project (job) is defined in block 204. This includes identifying the location and area of the project, the type of project, the scope of the project, contractors and construction companies for the project, project schedules, etc. For example, if a sign is being placed in an area and the sign installation is to bury the sign pole 2 ft deep into a 1 ft-wide hole that has been created using an earth auger and place cement into the hole, then utility lines in the area of the project parameters, in this case, within 2 ft of the ground surface plus an added buffer zone, are identified and the associated entities notified.

For example, if the sign pole installation is over a sewer line and the sewer line is 9 ft deep and no other lines are in the area of concern, the pole installation may able to proceed since it will not have any effect on the sewer line, which is buried 9 ft deep. However, if records on file indicate that a gas line is somewhere in proximity and the confidence level of the precise location data is low, then perhaps additional measures should be taken before breaking ground even for just a pole installation. Once the pole is installed, the system could update the pole installation with GPS data, images, such as photographs and field notes.

Identifying the location and area of the project may be accomplished in various ways including latitude and longitude, or GPS data. For example, a user can identify a project area by circling the project area on a map or making a tile on a map (e.g., a Google™ Earth, Microsoft Virtual Earth, etc.) using a pointing device, such as a mouse, electronic stylus or touch screen, identifying the street address of the construction area, identifying an intersection, a land mark, a postal zip code, or the like. A map tile is an imagery of the earth taken from above and associated with geographic coordinates. Imagery is often captured from satellites or aircraft and associated with latitude and longitude values. A map tile accuracy is the margin of error of a map tile associated geographic coordinates corresponding to the true geographic coordinates.

Referring back to FIG. 2, GIS Landbase (data) 206 is then accessed by the one or more computers. The GIS Landbase is created utilizing map data 208 and is stored in a database. The database 202 stores information about the utility assets, including their locations, types, and owners. However, the data for different utility assets may have different accuracies. Alternatively or in addition, the data may be retrieved from various different databases, each with a different accuracy. Using the precision database 202, which includes the utility assets and their locations, the utility assets relevant to the project area (and optionally to the project type and/or scope) are then identified. Data related to the identified utility assets is then retrieved from the precision database. The retrieved data includes the utility type, location, the utility company responsible for, associated with, the contact information of such utility companies, meta data for pedigree and the like. The retrieved utility asset may have different risk levels and accuracy levels and therefore different confidence levels. Furthermore, the user may have different accuracy requirements, for example, 4 inches for gas pipelines, 2 inches for electrical lines and 1 foot for sewage lines.

Data management operations 212 are then invoked to manage and distribute data, for example, to automatically send notifications to respective users, for example by a transmitter, which may be part of the one or more computers. For example, the notification may also be sent to the personnel in the field and other related parties, taking into account the different accuracy levels of the data and the viewing devices. The notification may be in the form of an email, a facsimile, text message, an automatic phone call, an upload of data into a certain website, database, electronic device or the like.

Figure 3:
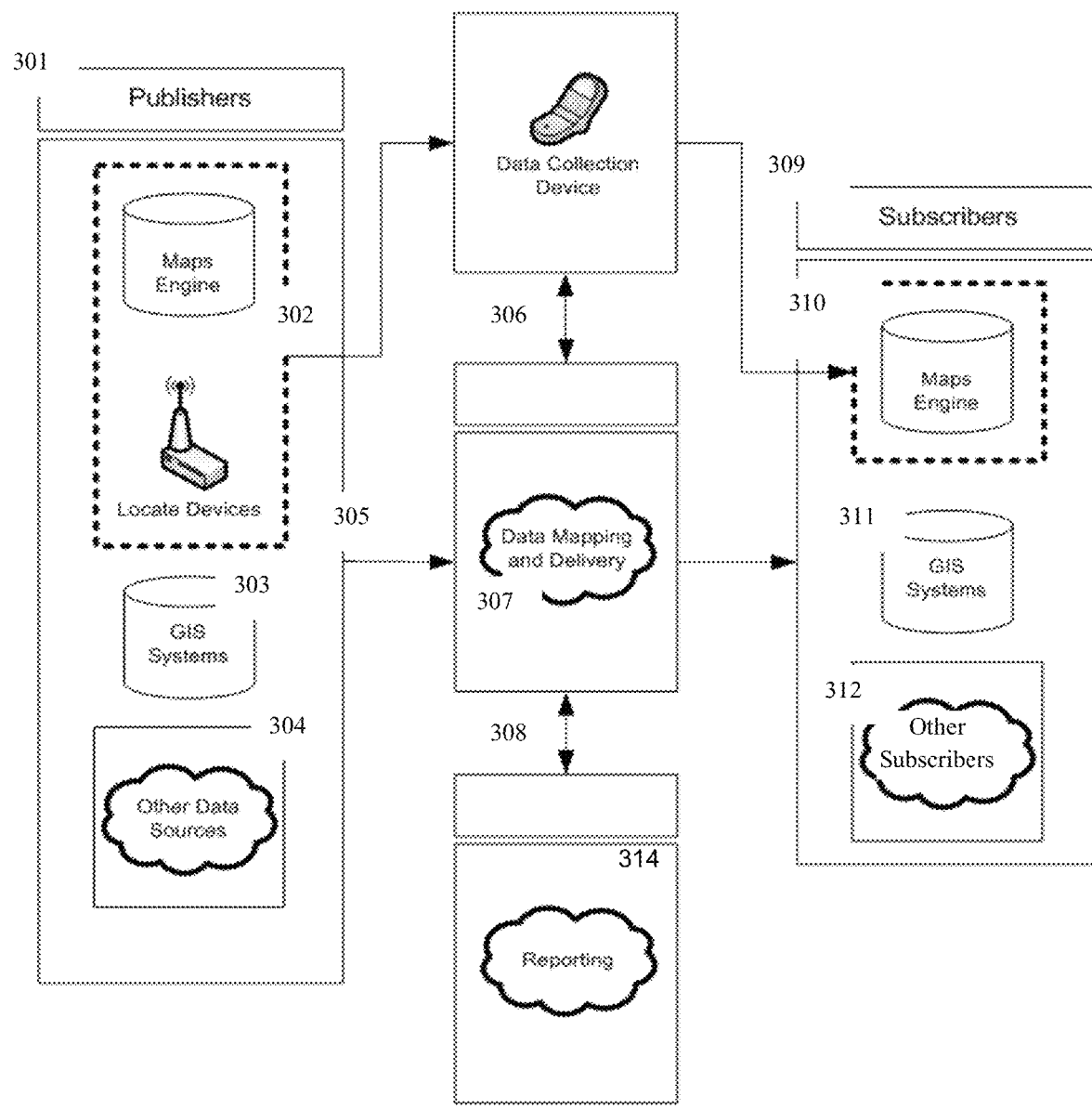
FIG. 3 is an exemplary bock diagram depicting an environment, according to some embodiments of the present invention.

FIG. 3 is an exemplary bock diagram depicting an environment, according to some embodiments of the present invention. In this example, Publishers 301 are all entities that have data that is pushed to the system of the present invention.

A GPS-centric mobile software application enables authorized field personnel to capture a precise point of asset locations and other location related information from a data locate tool or compliant mobile device. The software application collects GPS location points including the precision of the point and the pedigree in the metadata associated to the point being captured and captures, binds and submits the precision and pedigree of the data to a database in real time. In some embodiments, the software enhanced by a map engine, for example, Google Maps Engine™, provides the field workers with the ability to visualize their proximity relative to existing infrastructure, view any existing data related to that infrastructure and provide the ability to edit historical location data, update design drawings, capture GPS tagged photos and make notes or sketches before submitting the information to the database.

Another software application provides the field utility workers with the visualization, situation awareness and precise location data required to enable better decisions to be made and complete field tasks with greater efficiency. The real-time functionality provided by the software allows workers to view all the available data relative to their location including above or below ground assets, as-built information, photos and any documents related to a point, line or bounded area. In some embodiments, the software is configured to use precise GPS-centric data and a precision integration processes to provide a view of the location of field workers relative to the location of buried and surface assets from a browser or other viewing applications.

Published data from the Publishers 301 can be in any format, and can be delivered via any data communication protocol. As shown, a mapping engine 302, such as Google Earth™ and locate devices can deliver data directly to the GPS-centric mobile software application. Other publishers may have to go through an interface, for example, a data mapping and delivery interface 307, in order for their data to be published to the GPS-centric mobile software application.

GIS Systems 303 include GIS data with different accuracy and risk levels. GIS System integration can be perform through a variety of means. For example, through a flat file integration (e.g., shape files, KML, XML, etc.) via FTP, SMTP, SFTP, AS2, etc., or through an application programming interface (API) calls initiated by a data mapping and delivery interface 307 (e.g., via REST API or other options available through various GIS systems). Other data sources 304 refers to any source that contains information that can be exported in some format and delivered to the data mapping and delivery interface 307, via a push or pull mechanism.

In some embodiments, the map engine and locate devices can communicate directly with the GPS-centric mobile software application. However, publishers 301 (including the above-mentioned two) can go directly to the data mapping and delivery interface 307. Data can be synchronized directly between the GPS-centric mobile software application and data mapping and delivery interface 307 for data rectification, mapping, modification, reporting, etc., as shown by 306.

Data mapping and delivery 307 are those components of the data mapping and delivery interface 307 directly applicable to the data flow shown in FIG. 3. In some embodiments, data from data mapping and delivery interface 307 can be queried and displayed directly by a reporting module 308.

Some subscribers 309 may also be publishers. That is, the GPS-centric mobile software application can push data directly to Google Maps Engine, and does not have to go through the data mapping and delivery interface 307. GIS systems 311 can be integrated with via a variety of techniques some of which, are described above with respect to GIS systems. Data can be delivered in any format and via any protocol to subscribers who have proprietary systems, as shown by 312.

In some embodiments, the present invention take into account the various data accuracies from different publishers 301, different GIS systems 303, different data sources 304, and/or different subscribers 309 and their different viewing devices, and generates a correlated optimum accuracy for these various accuracies.

In some embodiments, data integrity requirements differ from project to project. The PI Grid may be designed to support a higher level data integrity requirement, for example, damage prevention, pipeline integrity, high consequence area (HCA), emergency planning zone (EPZ), maximum operating pressure (MOP), and archeological site, each of which require a higher level data integrity requirements and management protocols. By supporting the higher level of data integrity requirement, value added services may be provided for the remainder of utility asset management projects including those that have lesser standards for data integrity.

This way, the method and system of the present invention provides a single source view into a single (conflated) view with the associated precision and pedigree and/or accuracy/precision of each layer and source of each layer to enable a user to determine appropriate protocols based on the quality or precision of the data layers presented including the user's confidence in his or her decision. In some embodiments, the method and system of the present invention determines which data source or layer needs to be improved or updated in order to qualify to meet specific precision and pedigree standards associated with risk levels. For example, data source or layer 1 may be "A" level quality; data source or layer 2 and 3 may be "B" level whereas data source or layer 4 may only qualify as "D" level. If the criteria is no less than "B" level then data source or layer 4 need to be updated or correlated to meet the minimum required standards or precision level.

For example, if data quality is poor, larger buffer zones may be required. If a gas line is being put in the ground and the previous information for that area is old and only qualifies as D quality data, the gas line may have to be exposed and while exposed, B quality (more precise) data may be captured using precision GPS data collection devices. Once more precise data is captured, the system of the invention may notify stakeholders (associated entities) of the improved data and various processes/actions may be initiated as a result, for example, decreasing the buffer zone, creating inspection ticket with regulatory agency or the like may be initiated.

As another example, if a gas line is in the vicinity of an area of interest or project area and within a (predetermined) buffer zone based on data pedigree of, for example, C quality, the line may be required to be exposed to capture a better quality location (and other) data to provide increased confidence and to make sure it is not damaged during performance of a project or too much pressure created from cement placed on top of it. For instance, if the gas line is actually 3 ft from where previous records indicated, this could be cause of concern to an electrical company as the data may now indicate that the gas line is too close to an electrical line.

In another case, a regulatory agency may need to know about this inaccuracy as it fails the required compliance. Accordingly, both the gas and electrical companies may have to comply with the compliance requirements and thus another agency may have to be notified and get involved to provide proof of proper action to meet compliance. Once the gas line is exposed, a requirement may be to take a GPS reading with a more precise depth, x and y coordinates. When the new more accurate data is taken and the improved precision and pedigree recorded, all stakeholders may be notified of the new data and also rectify their own internal records (databases) that depend on this new information.

In some embodiments, the present invention handles more than tolerance from layers that create a confidence area or buffer zone based on the utility and pedigree information by providing other buffer zones or areas of confidence such as for a high consequence area (HCA). An HCA is based on impact areas when pipelines carrying high pressure and low pressure liquid and gas run through an area where impact zones are created based on a potential incidence and what would impacted in such an event. Environmental zones such as for birds, beavers and other wildlife can be impacted in the event of an incident and for HCA it is when a pipeline is distributing liquid or gas through a populated area and structures close to the pipeline need to be monitored.

These structures would be, but not limited to, schools, day care facilities, malls, homes, apartments, businesses and shopping malls etc. Also, occupancy, hours of business etc. need to be known, which can be described as precision and pedigree in terms of what, who, where, when and how could be impacted in the event of an incident. A set of processes determine the structures that need to be monitored based on the HCA and environmental zones (offset) relative to the asset location and path. These feature are especially valuable for current infrastructure as well as planning and design of new assets. This information is generally acquired from census information and other public records and could automated.

These tolerance (buffer) zones may rendered and displayed in both two and three dimensional views and may be color coded to match the quality level. Moreover, the tolerance (buffer) zones may be rendered on a digital map to represent the calculated distance of spatial data accuracy and to visually represent differing quality levels between multiple data sources with differing accuracies. The user is given a visual representation of the features and provided instant access and awareness regarding the geospatial feature on the information map. In some embodiments, the calculated buffer distance is displayed as a tolerance (buffer) zone by rendering a measured halo around the vicinity of the map feature or object, thus providing the user a visual representation of the quality and spatial accuracy for both horizontal and vertical data including X, Y, and Z coordinates and depth of measurements. As the extended metadata is updated, the invention recognizes the revised information and in real-time recalculates the buffer and quality tolerances to provide an updated view of the feature accuracy. These tolerance (buffer) zones may be around a point, a line, and/or an area of interest.

In some embodiments, the spatial accuracy of map features is defined within the feature information as extended data to the existing metadata. By describing the contents and context of data files, the quality and understanding of the original data is greatly increased. These embodiments extend the metadata to include additional information about the utility asset, such as regulatory quality levels, consequence variables, along with instrumentation readings and their values, which allows the system and method to calculate accuracy tolerance buffers and render halos around map feature objects based upon it's known and qualified spatial accuracy and quality level attributes as stored within the extended metadata fields.

Figure 4:
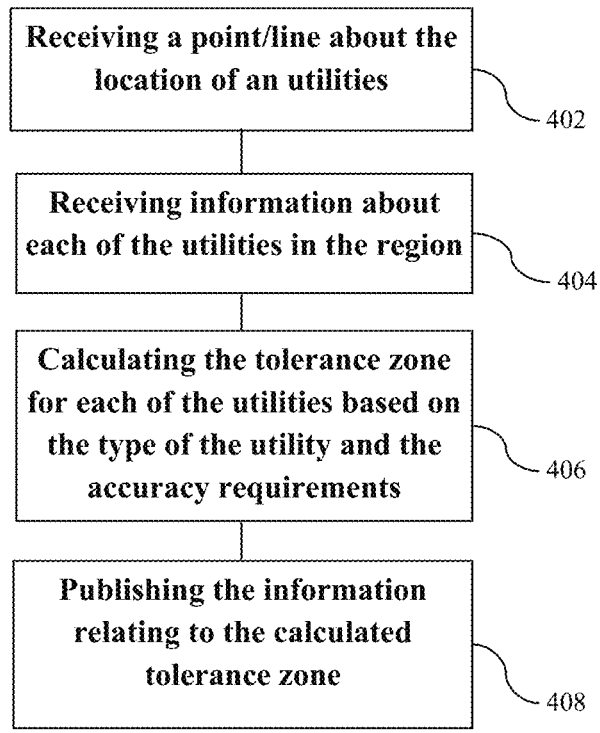
FIG. 4 shows an exemplary process flow for calculating tolerance (buffer) zones, according to some embodiments of the present invention.

FIG. 4 shows an exemplary process flow for calculating tolerance (buffer) zone, according to some embodiments of the present invention. As shown in block 402, a point, a line, or an area about the location of the utilities in a region is received. This point or line may be received from a mobile device (or input device) on a display of which, a user marks a point or draws a line (using a cursor or touch screen) on a map. Furthermore, the above information may be received by any of the above-described methods. In block 404, the information about (including the location of) each of the utilities in the region is received from one or more databases, for example by a receiver. In block 406, the computer implemented process of the invention then derives or calculates the tolerance zone for each of the utilities in the region based on the type of the utility, the accuracy requirements for the utility and/or the region, and the type of device used to determine the spatial coordinates, the map tile accuracy, locate tool accuracy, etc. In some embodiments, the tolerance zones are derived from the aggregate accuracy GPVA and the map visual accuracy mean (MVAM) formulas, as explained below In block 408, the information relating to the calculated tolerance zone is published as a vector or tiled image halo surrounding a geospatial map feature rendered on a digital map. In this case, publish refers to making data available for other users to view, for example, a point that is made available on a map for display and or editing to users with the correct permissions. An unpublished point, would not be available for users to view or change. In some embodiments, the information relating to the calculated tolerance zone is transmitted to a remote device by a transmitter which may be part of a server system and a mobile device.

The tolerance zone specific for each utility in the selected region may then be displayed on a display as a layer on a map. In some embodiments, the displayed tolerance (buffer) zone matches the pedigree accuracy for each point (of the line, in case of a line zone). For example, a tolerance (buffer) zone matching the pedigree accuracy for each point of a line may be displayed with a transparent colored area being the tolerance (buffer) zone for the line. In some embodiments, a selected group of the tolerance zones may be turned on or off for display. These tolerance zones may then be utilized to generate an alert or warning for a mobile user or a digging equipment operator, as the user or the equipment approaches or within a tolerance zone. In some embodiments, if the tolerance zone is small (for example, smaller than a programmable value), less number or less frequent notification or warnings are issue and vice versa.

These tolerance (buffer) zones may be utilized in a variety of different applications. For example, in some embodiments, the tolerance zones may be used with given standards or guidelines for data quality levels, for example, A to D) for collection and depiction of the utility data to provide an aggregated view when displaying utility data. In some embodiments, the tolerance zones may be used with given standards or guidelines for mapping of underground utility infrastructure (for example, for positional accuracy levels 0 through 5) to provide an aggregated view when displaying utility data. In some embodiments, the tolerance zones may be used with pedigree data, including who collected the data, what data was collected, why the data was collected, where it was collected, when it was collected, and how it was collected.

In some embodiments, the tolerance zones may be used with precision attributes, including instrumentation readings and settings required to calculate precision from data collection devices such as locate tools, GPS devices, geophysical equipment, etc.

In some embodiments, the present invention is particularly useful for "acts of God" situations, for example, when an earthquake, a fire or hurricane, and the like occurs. In these cases, based on predictive models each event could have a varying degree of impact on the utility asset and that could create an incident and immediate notices or warnings may be triggered to the relevant parties within a zone of impact.

According to some embodiments of the present invention, a mobile device used as a locate device and/or viewing device, based on the location of the device, creates a (map) tile with all the data required to work within that tile regardless if the device has connectivity to a master geo database or not. The mobile device caches all the data layers in the specified work area (tile) and synchronize when data is being pushed or pulled from a server. If at any point connectivity is lost, the mobile device can still be used to proceed with the work and synchronize when connectivity is regained.

In some embodiments, the mobile device may be configured as a viewer into the database including all the data and imagery, so that the field worker has the database available in the field where data in the data base can be captured, verified and rectified. The mobile device in this case becomes the in-the-field server for the locate tools in which, data can be captured, stored and pushed to the server as well as pulling information.

In some embodiments, the present invention uses the square root of the sum of the squares to calculate the aggregate accuracy of a measurement (data), when the accuracies of all the measuring components, data sources and viewing devices in the system are known. A GPS point may be defined as the latitude, longitude, and time (and optionally elevation) as recorded by a GPS receiver. A GPS point accuracy is the combined accuracy of the visible system when displaying a GPS point on a map tile. A GPS point visual accuracy is the combined accuracy of the visible system when displaying a GPS point on a map tile.

For example,

Let MT1 represent a visible map tile,
Let MTa1 represent the associated map tile accuracy value for that tile,
Let GPS1 represent a visible GPS point, and
Let GPSa1 represent the associated GPS point accuracy value of that point.
Then, the aggregate accuracy GPVA can be obtained by following $$GPVA = \sqrt{(MTa1)^2 + (GPSa1)^2} \qquad (1)$$

For example, assuming MT1 is a visible map tile with an associated accuracy of 3 feet and GPS1 is a visible GPS point with an associated accuracy of 8 feet, then:

$$GPVA = \sqrt{(3)^2 + (8)^2} = 8.544 \text{ feet.}$$

A map visual accuracy mean is a map visual accuracy mean when displaying one or more GPS Points on one or more map tiles. In some embodiments, the present invention calculates a map visual accuracy mean (MVAM) by the following equation:

$$MVAM = \left( \frac{GPVA1 + GPVA2 + \ldots}{n} \right), \qquad (2)$$

where (GPVA1, GPVA2, . . . ) are the set of GPS Point Visual Accuracy values for a visible map, and N is the number of GPS Points. From the example above, the MVAM value would be used to display the tolerance zone as a halo around a point, line or area displayed on a map.

In some embodiments, the present invention includes the capability of storing photos, documents, videos and other multi-media content in association with a project and/or GIS data. In some embodiments, any file that a user saves, for example, to a drop box, will be automatically saved to all computers, phones and the (cloud) website of the user. This feature of the present invention makes it much easier to share GIS and utility asset information with others, as a locator, engineer, regulatory agency, and the like.

Figure 5:
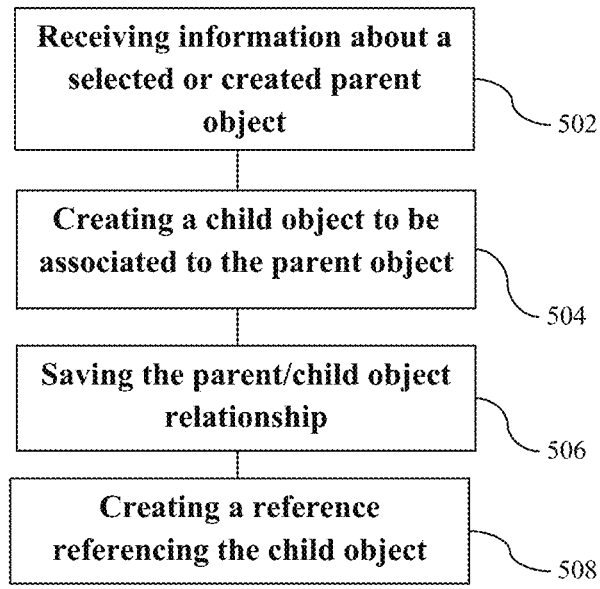
FIG. 5 illustrates an exemplary process flow for creating a drop box, according to some embodiments of the present invention.

FIG. 5 shows an exemplary process flow for creating a drop box, according to some embodiments of the present invention. For example, if the user clicks on a point (e.g., on a map), the system will show all the documents and/or data related to or associated with that point. If the user selects a line, the system will show the documents and data and optionally perform an action related to the line (which may be a utility line, etc.). If the user points to an area, then the system will show the documents and data and optionally perform an action related to the area (which may be a project area, a map tile, etc.).

As shown in block 502, a geospatial parent object is selected or created; and the information about the selected or created object is received, for example, by a server computer. For example, the parent object may be created on a map by a user using a set of geospatial coordinates such as, latitude and longitude, GPS etc. This object may then be moved to a new geospatial location by a second user. The object may be one or more of a file, a document, an image, a database entry, a directory tree, or the like. The object may be selected from a map display or from data entered by the user. For example, a polygon, line or point on a map or display may be selected and then a drop tool menu button may be activated for activating the drop tool function. A drop toll dialog box may be displayed for the user to enter and/or select information.

A child object to be associated to the parent object is then selected or created, in block 504. For example, an object from a map may be selected, and the selected object may be assigned as a child object to be related to the (selected or created) parent object. For example, using a "drag and drop" function, the selected object is assigned a child relationship to the (selected or created) parent object. As another example, selecting a menu item (for drop box) provides access to the assignment function, for example, a folder, where files and objects can be added to, removed from or edited in the folder. The object may appear graphically in an onscreen dialog box showing the child object and the parent object relationship. The user may then be prompted to confirm the assignment between the parent and child objects.

In block 506, this parent/child object relationship is saved. A reference pointer, for example, uniform resource locator (URL) or a pointer to a database, referencing the child object is then created, in block 508. This way, a remote client (user) can access the object (e.g., a file) via the geospatial view by navigating to the referenced geospatial location and using the drop box, or accessing the object (e.g., a file) via the created reference, for example, the URL.

In some embodiments, the user may be provided with a listing of the stored objects. A second user, located remotely from the first user, can then access an objects via a geospatial view by navigating to the referenced geospatial location and using a Drop Tool menu, or by accessing the object via an URL.

In some embodiments, a user may upload historical and/or associated files as child objects to an online data repository and assign or associate the child object files/documents to one or many geospatial map parent features leveraging "drag and drop" tools or a manual child data entry field. In some embodiments, the URL is associated with an identifier of an object or an object listing, associated with a point, line or area. This link can then be shared with a second user to access the same object or object listing, associated with the point, line or area on the map. Moreover, the parent object may be dragged or moved to a new geospatial position on the map and the associated child objects will automatically inherit this new geospatial location, and some or all precision, pedigree, and provenance data elements from the parent object.

Furthermore, the invention provides custom filtering for the user so that only a selected portion of documents and data are shown. For example, the user may select only regulatory documents or data to be shown with respect to a line, only data about gas utility lines to be shown for a point, or only certain documents or data to be shown when a point is selected. The actions to be performed may include certain types of reporting notifications, instructions sent, or other type of warning and/or notifications.

In some embodiments, the drop box feature is geo spatial precise, meaning the invention makes sure that all the files are based on the same precise location point, no matter where the user is working from. A user is able to invite his/her co-workers, third parties and/or regulatory agencies to share any folder in his/her drop box and even set up notifications when new files are dropped or old files updated. Moreover, the user can send links to specific files in his drop box to others.

Figure 6:
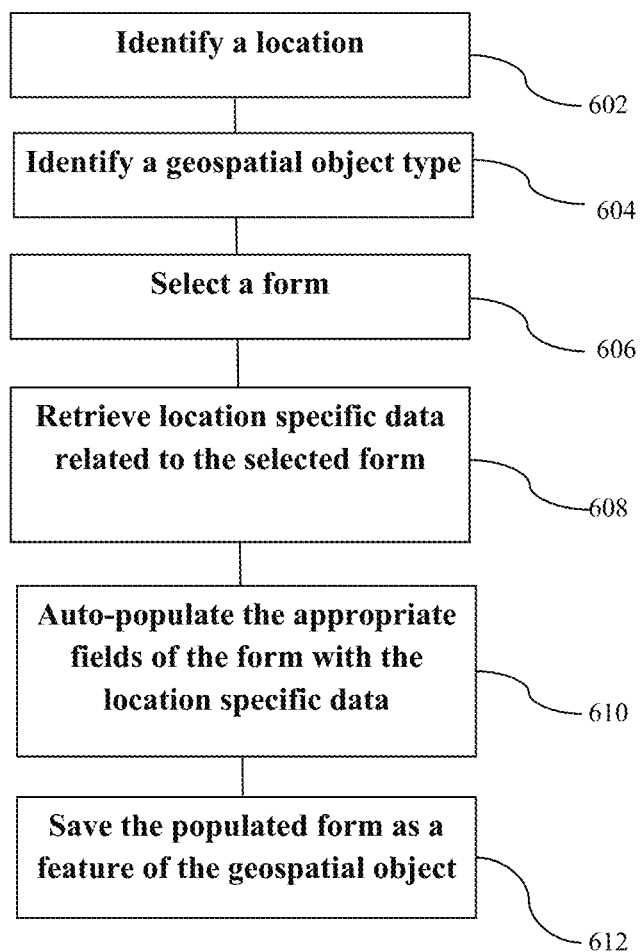
FIG. 6 shows an exemplary process flow for auto-populating an interactive electronic form based on geospatial coordinates, according to some embodiments of the present invention.

FIG. 6 shows an exemplary process flow for auto-populating an interactive electronic form based on geospatial coordinates, according to some embodiments of the present invention. Based on a geospatial position, a query is initiated to generated results to be used as inputs into an electronic form. The invention auto-populates and fills the electronic form and provides access to these forms via a link associated with a point, line or area. The user may search, and filter data stored in the online database by using geospatial location or selected coordinate from the mobile client.

As shown in block 602, a location is identified. The location may be identified on a displayed map using a pointer/cursor, by an address, an intersection, a land mark, a neighborhood name, or other known methods of identifying locations. In block 604, a geospatial object type is identified. For example, a point, a line or a polygon or other symbols may be selected in a map. An interactive form is then selected or retrieved from a list of forms or a database, in block 606. The forms may be any type of business and government forms, for example, an inspection form, a procedure document, a survey form, and the like. In block 608, the location specific data related to the selected form (and the geospatial object type) is identified and retrieved, from a database. If the form is related to a land parcel for instance, the database may contain metadata relating to this parcel that would be specific to this parcel and would be retrieved from the database. For example, one or more of the owner's name contact information, the property mailing address, legal description, zoning, land use, etc., may be retrieved.

In some embodiments, the geospatial data would typically come from a GPS device, and secondly these forms would be filled in the field using a mobile device. However occasionally, the form would be modified or completed from a desktop computer.

In block 610, the appropriate fields of the identified form are auto-populated with the location specific data. The populated form is then saved as a feature of the geospatial object (e.g., point, line or area), in block 612.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A computer implemented method for damage avoidance in an excavation area, the method comprising:
   receiving input for defining an excavation project including an excavation area and an excavation depth;
   accessing a database of a plurality of utility assets, each entry for each utility asset including a type of the utility asset, a location of the utility asset, an accuracy of the data about the location of the utility asset, a buffer zone associated with the utility asset, a depth of the utility asset when buried under the ground, and a party responsible for the utility asset;
   receiving input for identifying a buried utility asset within the excavation area;
   retrieving utility asset information from the database for the identified buried utility asset;
   auto-populating an electronic form with the retrieved utility asset information for the identified buried utility asset, from the database;
   fusing the buffer zone associated with the buried utility asset and the depth of the buried utility asset to obtain a latitude buffer zone for the buried utility asset;
   identifying the party responsible for the buried utility asset, from the database; and automatically transmitting an electronic notification including the auto-populated electronic form and the latitude buffer zone to the party responsible for the buried utility asset.

2. The method of claim 1, further comprising transmitting the electronic notification to a mobile device in the excavation area.

3. The method of claim 1, wherein said input for defining an excavation project is received from a remote device, by marking a point or drawing a line using a cursor or touch screen on a map displayed-on the remote device.

4. The method of claim 1, further comprising
receiving data about a point, a line, or an area related to a location of an utility asset in a region;
calculating a tolerance zone for said utility asset in the region based on the accuracy requirements for the utility asset, accuracy of the location of the utility asset, and accuracy requirements for the region; and
transmitting the tolerance zone to a remote location.

5. The method of claim 4, wherein said tolerance zone is calculated from an aggregate accuracy and a map visual accuracy mean.

6. The method of claim 1, wherein said database comprises of a plurality of different data sources, the method further comprising determining which data source needs to be updated in order to meet a data integrity requirement of the database.

7. The method of claim 6, wherein each of said plurality of different data sources have a different accuracy, the method further comprising generating a correlated optimum accuracy for said plurality of different data sources.

8. A system for damage avoidance in an excavation area comprising:
a receiver for receiving input for defining an excavation project including an excavation area and an excavation depth;
an interface for accessing a database of a plurality of utility assets, each entry for each utility asset including a type of the utility asset, a location of the utility asset, an accuracy of the data about the location of the utility asset, a buffer zone associated with the utility asset, a depth of the utility asset when buried under the ground, and a party responsible for the utility asset;
a processor for identifying a buried utility asset within the excavation area, retrieving utility asset information from the database for the identified buried utility asset, auto-populating an electronic form with the retrieved utility asset information for the identified buried utility asset, from the database, fusing the buffer zone associated with the buried utility asset and the depth of the buried utility asset to obtain a latitude buffer zone for the buried utility asset, and identifying the party responsible for the buried utility asset, from the database; and
a transmitter for automatically transmitting an electronic notification including the auto-populated electronic form and the latitude buffer zone to the party responsible for the buried utility asset.

9. The system of claim 8, wherein the transmitter further transmits the electronic notification to a mobile device in the excavation area.

10. The system of claim 8, wherein said input for defining an excavation project is received from a remote device, by marking a point or drawing a line using a cursor or touch screen on a map displayed on the remote device.

11. The system of claim 8, wherein the receiver further receives data about a point, a line, or an area related to a location of an utility asset in a region; the processor calculates a tolerance zone for said utility asset in the region based on the accuracy requirements for the utility asset, accuracy of the location of the utility asset, and accuracy requirements for the region; and the transmitter transmits the tolerance zone to a remote location.

12. The system of claim 11, wherein the processor calculates said tolerance zone from an aggregate accuracy and a map visual accuracy mean.

13. The system of claim 8, wherein said database comprises of a plurality of different data sources, and wherein the processor determines which data source needs to be updated in order to meet a data integrity requirement of the database.

14. The system of claim 13, wherein each of said plurality of different data sources have a different accuracy, and wherein the processor generates a correlated optimum accuracy for said plurality of different data sources.

* * * * *

UNITED STATES PATENT AND TRADEMARK OFFICE
CERTIFICATE OF CORRECTION

PATENT NO. : 10,671,650 B2
APPLICATION NO. : 15/434333
DATED : June 2, 2020
INVENTOR(S) : Nelson Page Tucker et al.

It is certified that error appears in the above-identified patent and that said Letters Patent is hereby corrected as shown below:

In the Claims

Column 13, Line 11, Claim 3    delete "displayed-on" and insert -- displayed on --

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*